(12) United States Patent
Hudson

(10) Patent No.: US 6,249,573 B1
(45) Date of Patent: Jun. 19, 2001

(54) METHOD OF TIME-TO-TALK CALCULATION

(75) Inventor: Dan Hudson, Marietta, GA (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/140,445

(22) Filed: Aug. 26, 1998

(51) Int. Cl.[7] .................................................. H04M 17/00
(52) U.S. Cl. ............................ 379/144; 379/112; 379/114
(58) Field of Search .................. 379/111–118, 120–121, 379/127, 133–134, 143–144, 219–222, 242–245; 455/406, 411

(56) References Cited

U.S. PATENT DOCUMENTS 5,469,497   11/1995   Pierce et al. .
5,815,561 * 9/1998   Nguyen et al. ...................... 379/115

* cited by examiner

*Primary Examiner*—Duc Nguyen
(74) *Attorney, Agent, or Firm*—Carter, Ledyard & Milburn

(57) ABSTRACT

A method of calculating the maximum talk time by:
a. determining rate for the period of time when the call begins
b. calculating
  (i) the maximum number of time units remaining in the time period
  (ii) the maximum number of units before reaching system maximum talk time
  (iii) the maximum units before available funds exhausted
c. using the minimum calculation of b(i), b(ii), and b(iii) as the talk time available and subtracting the amount from a copy of the PPCard balance
d. if b(i) is the minimum, successively repeating the above steps for the next time period and adding the amount to the talk time.

8 Claims, 6 Drawing Sheets

Cost=$24.25

| Time Period/ Rate | Morning First-15¢ /min Add.-10¢ /min | Afternoon First-20¢ /min Add.-15¢ /min | Evening First-15¢ /min Add.-10¢ /min | Night First-10¢ /min Add.-5¢ /min |
|---|---|---|---|---|

6AM — Noon — 6PM — Midnight — 6AM

4PM

|← 3HRS →|

Time To Talk
(Limited By Sys. Max.)

FIGURE 5

|  | 6AM | Noon | 6PM | Midnight | 6AM |
|---|---|---|---|---|---|
| Time Period/ Rate | Morning First-15¢ /min Add.-10¢ /min | Afternoon First-20¢ /min Add.-15¢ /min | Evening First-15¢ /min Add.-10¢ /min | Night First-10¢ /min Add.-5¢ /min | |

4PM
|←3HRS→|

Cost=$24.25

FIGURE 7

METHOD OF TIME-TO-TALK CALCULATION

BACKGROUND OF THE INVENTION

Voice response units ("VRUs") are well known. They allow a caller to enter and retrieve information by using the telephone keypad to respond to a voice menu. They can provide, for example, the playback of prerecorded, or voice synthesization of, successive digits in a telephone number in response to a request for directory assistance.

In prepaid telephone systems, VRUs are used to provide the subscriber with account information such as the time available to talk and billing information. This information may be obtained in a variety of ways. Some prior art systems charge a constant price per unit of time and thereby simply requiring the account balance to be divided by the price to obtain the available talk time (i.e., number of time units which can be purchased). These systems, while offering a straightforward approach for talk time calculations, are unable to support multiple rate time periods.

Other prior art systems providing multiple rate periods often use extensive looping in determining the available talk time. The systems subtract the cost of a unit of time unit from the account balance, check to see if the balance is less than zero, and if it isn't, add the time unit to the talk time. The systems then add the time unit to the current time, perform a check to see if a rate change is required for the "new" current time, and acquire the new rate if necessary. This process is repeated until the account funds are exhausted. The extensive looping required by these systems to obtain the available talk time/billing calculations results in degraded system performance.

Accordingly, it is an object of the present invention to provide a novel method and system for providing multiple rate periods while achieving near constant execution time regardless of the account balance.

It is another object of the present invention to provide a novel method and system which supports multiple rates during the course of a call while minimizing system performance degradation due to excessive looping.

It is yet another object of the present invention to provide a novel system and method for calculating the available talk time down to a one second granularity.

It is still another object of the present invention to provide a novel method and system for achieving constant execution regardless of the account balance and the system maximum talk time, while maintaining the ability to handle multiple rate periods without the algorithm being sensitive to clock changes.

These and many other objects and advantages of the present invention will be readily apparent to one skilled in the art to which the invention pertains from a perusal of the claims, the appended drawings, and the following detailed description of the preferred embodiments.

BRIEF DESCRIPTION OF THE DRAWINGS

FIG. 5 is a chart illustrating the time periods and rates for one embodiment of the present invention.

FIG. 7 is a chart illustrating the time periods and rates for one embodiment of the present invention.

DESCRIPTION OF PREFERRED EMBODIMENTS

Figure 1:
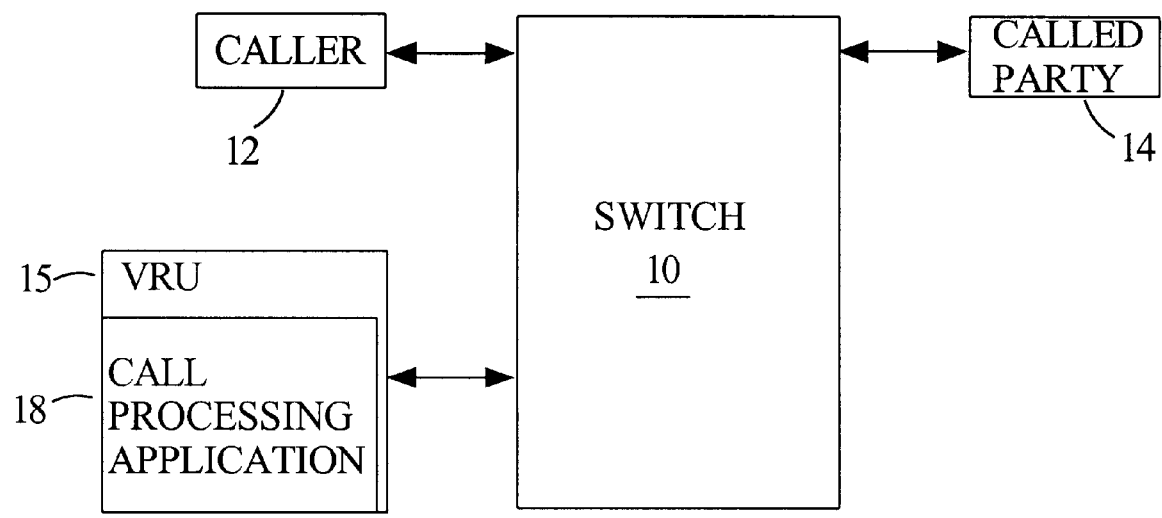
FIG. 1 is a functional block diagram showing the basic organization of the enhanced services system of the present invention in the embodiment of a prepaid telephone system.

FIG. 1, illustrating an enhanced services platform in the embodiment of a prepaid telephone system, shows a suitable conventional telephone switch 10 such as the Harris Corporation 20/20 switch in a conventional public switched telephone network (PSTN) connected to large numbers of subscriber telephones such as the caller telephones 12 and the called party telephones 14. Also connected to the switch 10 may be a bank of voice response units (VRUs) 15 on which the prepaid call processing application 18 resides.

Figure 2:
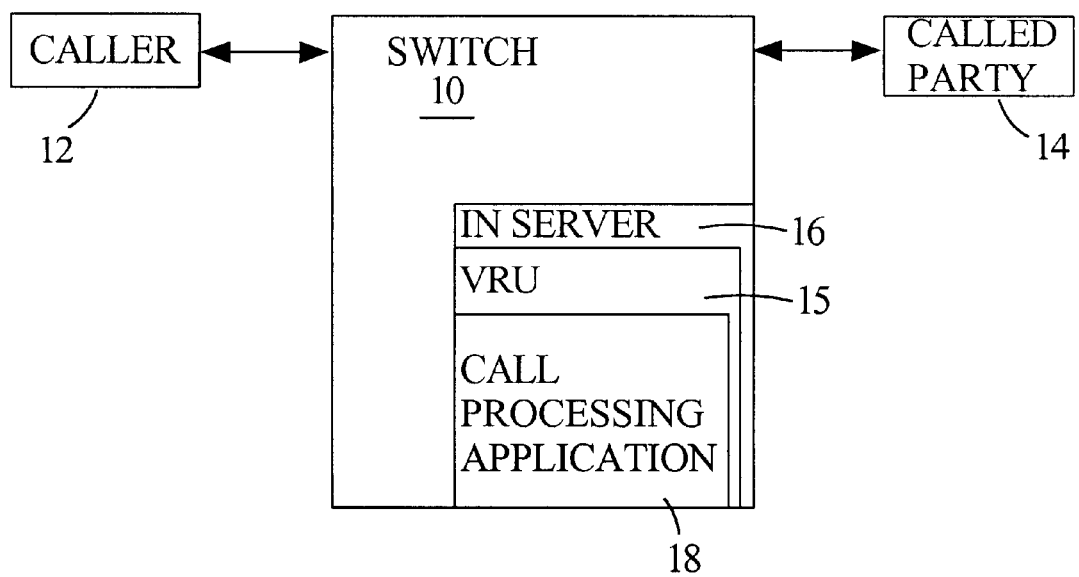
FIG. 2 is a functional block diagram of an embodiment of the present invention showing the voice response unit (VRU) embedded within the switching platform.

Alternatively as shown in FIG. 2, the VRUs 15 may be embedded within the architecture of an integrated network server (IN Server) 16 which is physically mounted on the back plane of the telephone switch 10. The embedding of the VRU in the switch platform effects seamless transfer of information and may be accomplished by means of an adaptor card with the elimination of the T1 and E1 circuits.

The management of a prepaid system is generally under the control of a call processing application resident within the VRU. The call processing application, in association with peripheral equipment, determines the action to be taken (e.g., determining the correctness of a PIN entry, the prompting of users for destination numbers or desired services, outdialing to a requested telephone number, etc.) during the processing of a call request.

Figure 3:
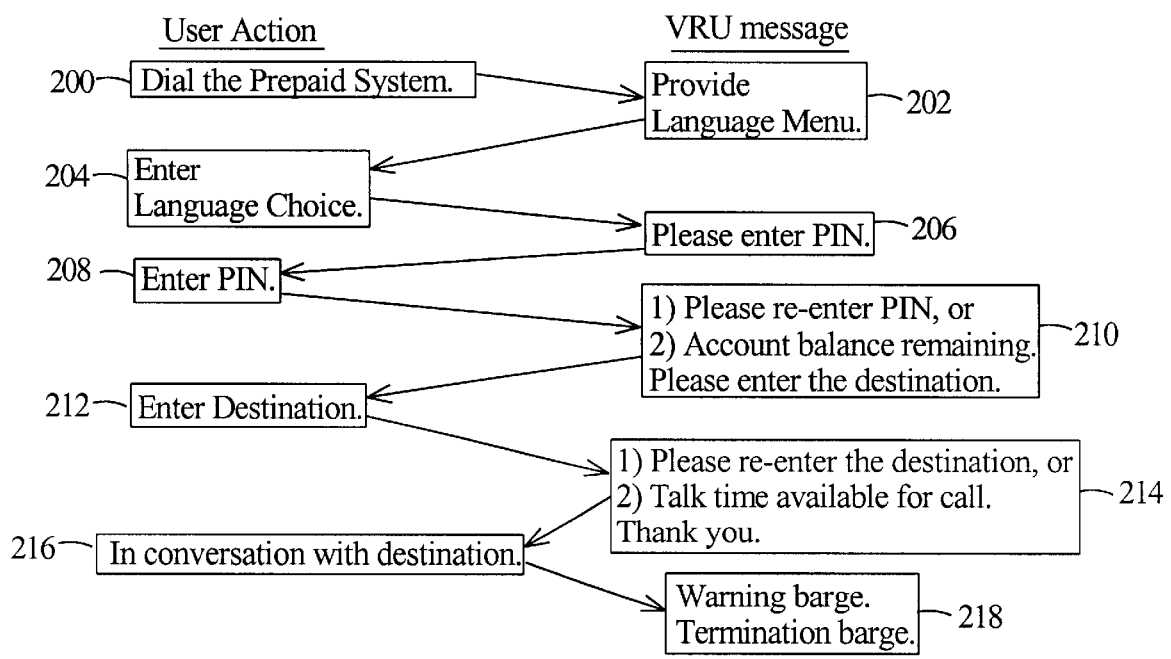
FIG. 3 is a flow chart illustrating a typical exchange between a caller and a prepaid system.

FIG. 3 illustrates a typical exchange between a caller and a prepaid system. The caller 12 dials into the prepaid telephone system (200) and upon connection is offered a choice of languages in which to proceed with the interaction (202). After the caller selects the desired language by keypad entry, vocal response, etc. (204), the caller's personal identification number ("PIN") is requested and provided (206, 208). Upon PIN validation, the account balance of the caller may be provided and the call destination is requested by the prepaid system (210). After the caller has entered the call destination, the prepaid system determines the amount of time available for the call and provides the information to the caller (214). During the call, voice messages pertaining to time warnings/call termination may be provided to the caller (218).

The amount of time available for the call ("TIME-TO-TALK") in accordance with one embodiment of the present invention is a function of the caller's account balance, a set system parameter for the maximum amount of time a caller may talk within a given call ("SYSTEM-MAX"), and the monetary rates associated with the time of day during which the call takes place.

Figure 4:
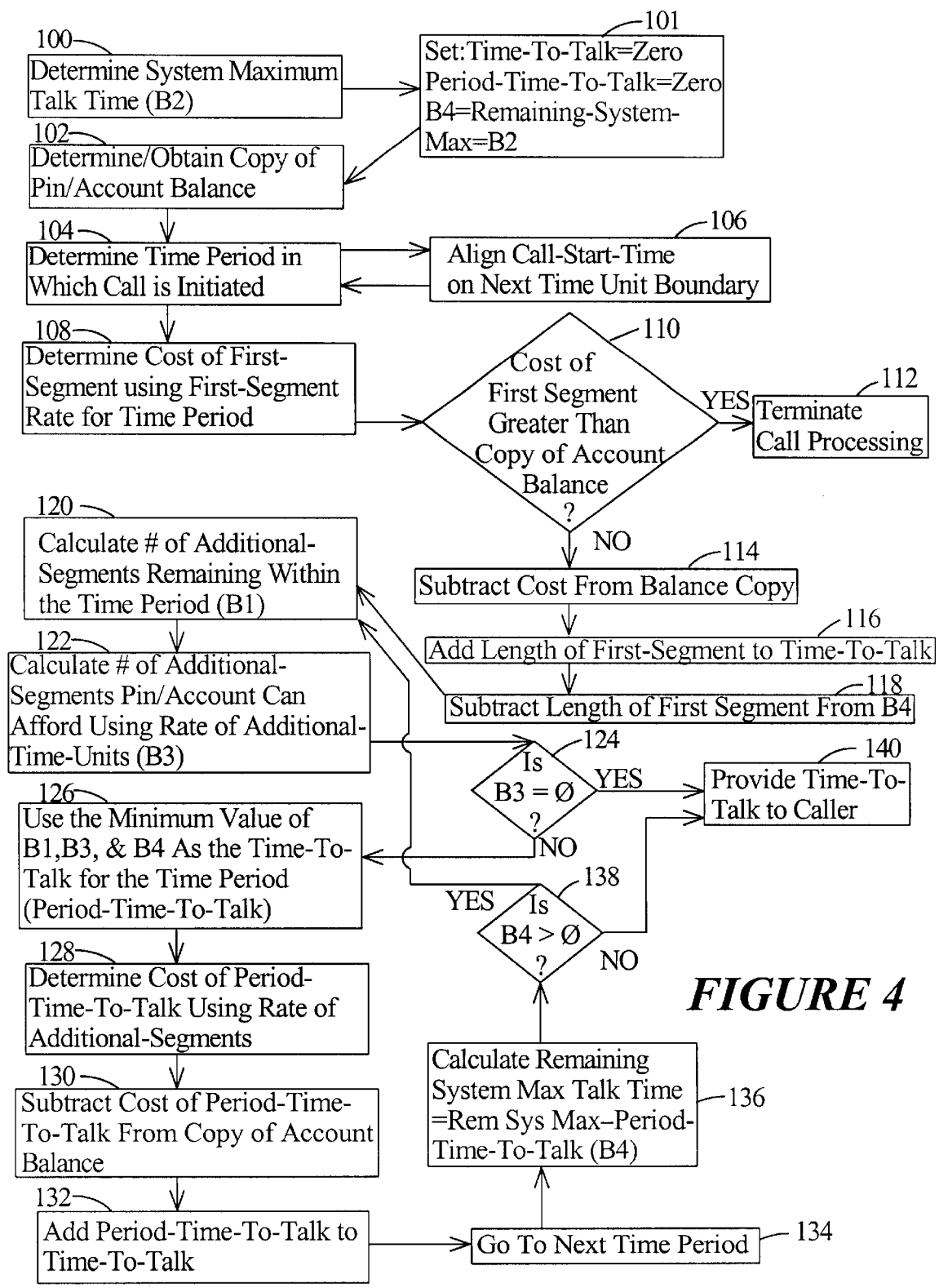
FIG. 4 is a flowchart illustrating the process used in determining the TIME-TO-TALK for one embodiment of the present invention.

FIG. 4 illustrates the process used to calculate the TIME-TO-TALK for one embodiment of the present invention. First the SYSTEM-MAX ("B2") is determined (100). As mentioned, the System Maximum Talk Time is a set parameter limiting the amount of time a caller may talk within a single call. The parameter is set and modifiable by the system administrator. The system then initializes the TIME-TO-TALK, the PERIOD-TIME-TO-TALK, and the REMAINING-SYSTEM-MAX (B4) parameters (101).

Next, a copy of the caller's account information ("ACCOUNT-BALANCE") is obtained from the prepaid system database using the caller's personal identification number ("PIN") (102) and the time period in which the call is initiated is determined (104). In determining the time period, the system aligns the start time of the call ("Call-Start-Time") with the next occurring time unit boundary (106), then determines the time period within which the time unit is contained.

When a call is initiated, a first segment of the call ("FIRST-SEGMENT") may be billed at a different rate than later segments ("ADDITIONAL-SEGMENTS") with the number of time units (e.g., minutes) within the segments and the associated rates set and modifiable by the system administrator. Once the time period has been determined, the system calculates the cost of the FIRST-SEGMENT plus any/all applicable surcharges and compares the cost to ACCOUNT-BALANCE (108, 110). If ACCOUNT-BALANCE is insufficient to cover the FIRST-SEGMENT cost, call processing is terminated (112). Otherwise, the cost of the FIRST-SEGMENT is subtracted from ACCOUNT-BALANCE (114) and the length of the FIRST-SEGMENT is added to TIME-TO-TALK (116) and subtracted from REMAINING-SYSTEM-MAX (118).

The system then calculates the number of ADDITIONAL-SEGMENTS remaining within the time period ("B1")(122) and the number of ADDITIONAL-SEGMENTS the PIN/account can afford ("B3") using the ADDITIONAL-SEGMENTS rate for the time period and the account balance information (126). If the account can not afford to purchase any additional segments (i.e., B3=0), the available talk time calculation is complete and the value stored as TIME-TO-TALK is provided to the caller (124, 140). If the account can afford additional time segments, the system then compares B1, B3, and B4 and uses the lowest value as the PERIOD-TIME-TO-TALK (122).

The cost of the PERIOD-TIME-TO-TALK is then calculated using the ADDITIONAL-SEGMENTS rate for the time period (128) and deducted from ACCOUNT BALANCE (130). Then, the PERIOD-TIME-TO-TALK is added to the TIME-TO-TALK (132) and subtracted from the REMAINING-SYSTEM-MAX (136). If REMAINING-SYSTEM-MAX is zero, the system maximum talk time has been reached ending the calculation of the available talk time and the accumulated TIME-TO-TALK value is provided to the caller (140). While an exit criteria of REMAINING-SYSTEM-MAX=0 is used for illustrative purposes, the REMAINING-SYSTEM-MAX does not have to equal zero, but may simply fall below a desired threshold value, to force the exit from the algorithm. For example, a REMAINING-SYSTEM-MAX falling below a six second threshold may force the exit although the granularity for one embodiment of the present invention will allow an accounting down to the second for both cost and time calculations.

If REMAINING-SYSTEM-MAX does not fall below the exit threshold value, the system considers the next time period. Since only one FIRST-SEGMENT exists for a given call with the remaining call time (ADDITIONAL-SEGMENTS) spread over one or more time periods, in considering subsequent time periods, the system uses only the ADDITIONAL-SEGMENTS calculations and associated rates (i.e., loop back to 111).

FIG. 5 illustrates the calculation of the TIME-TO-TALK for one embodiment of the present invention. In FIG. 5, there are four time periods (MORNING, AFTERNOON, EVENING, NIGHT) each consisting of 6 hours and having associated calling rates for the FIRST-SEGMENT and the ADDITIONAL-SEGMENTS.

In FIG. 5, the TIME-TO-TALK is determined for a call initiated at 4PM with the caller having an account balance of $40 and with a SYSTEM-MAX=3 hours, FIRST-SEGMENT=5 minutes, and ADDITIONAL-SEGMENTS=1 minute each. First, the cost of the FIRST-SEGMENT is calculated (5 min×20¢/min=$1) for the AFTERNOON time period. Since the account can afford the FIRST-SEGMENT (surcharges would also be included if applicable), call processing continues by deducting the $1 FIRST-SEGMENT cost from ACCOUNT-BALANCE [ACCOUNT-BALANCE=$39], adding the 5 minute FIRST-SEGMENT time length to TIME-TO-TALK [TIME-TO-TALK=5 minutes], and subtracting the 5 minute FIRST-SEGMENT time length from the REMAINING-SYSTEM-MAX [REMAINING-SYSTEM-MAX=175 minutes].

Next the system calculates B1 (the number of ADDITIONAL-SEGMENTS remaining in the time period) and B3 (the number of ADDITIONAL-SEGMENTS the PIN/account can afford) for the AFTERNOON time period. Since there are two hours minus the 5 minute FIRST-SEGMENT left in the AFTERNOON time period (4:05–6:00PM), B1=115 "additional" minutes.

Further, at the ADDITIONAL-SEGMENTS rate of 15¢/min with ACCOUNT BALANCE=$39, the PIN/account could afford B3=260 "additional" minutes. Since B3 is non-zero (i.e., the account can afford additional time), the TIME-TO-TALK calculation continues.

Using the minimum value of B1, B3, and B4 as the AFTERNOON-TIME-TO-TALK (i.e., B1=115 minutes), the cost of the AFTERNOON-TIME-TO-TALK is determined by multiplying B1 by the ADDITIONAL-SEGMENTS rate of the AFTERNOON period, 15¢/min, yielding $17.25. Subtracting this amount from the ACCOUNT BALANCE of $39 yields $21.75 to be applied to the next time period. The AFTERNOON-TIME-TO-TALK is added to the TIME-TO-TALK yielding an accumulated TIME-TO-TALK=120 minutes.

Repeating the B1, B3, and B4 calculations for the EVENING time period using the ADDITIONAL-SEGMENTS rate yields B1=360 minutes (i.e., 60 minutes/hr×6 hrs), B3=217.5 minutes (i.e., $21.75÷$0.10/min), and B4=60 minutes (REMAINING-SYSTEM-MAX AFTERNOON-TIME-TO-TALK=175–115). Selecting the minimum value of B1, B3, and B4 for the EVENING time period as the EVENING-TIME-TO-TALK (B4=60 minutes), and adding the EVENING-TIME-TO-TALK to the TIME-TO-TALK yields an accumulated TIME-TO-TALK=180 minutes. Since the REMAINING-SYSTEM-MAX was used for the EVENING-TIME-TO-TALK, deducting the EVENING-TIME-TO-TALK from the REMAINING-SYSTEM-MAX parameter results in a zero value forcing an exit from the algorithm with a final TIME-TO-TALK=180 minutes.

Figure 6:
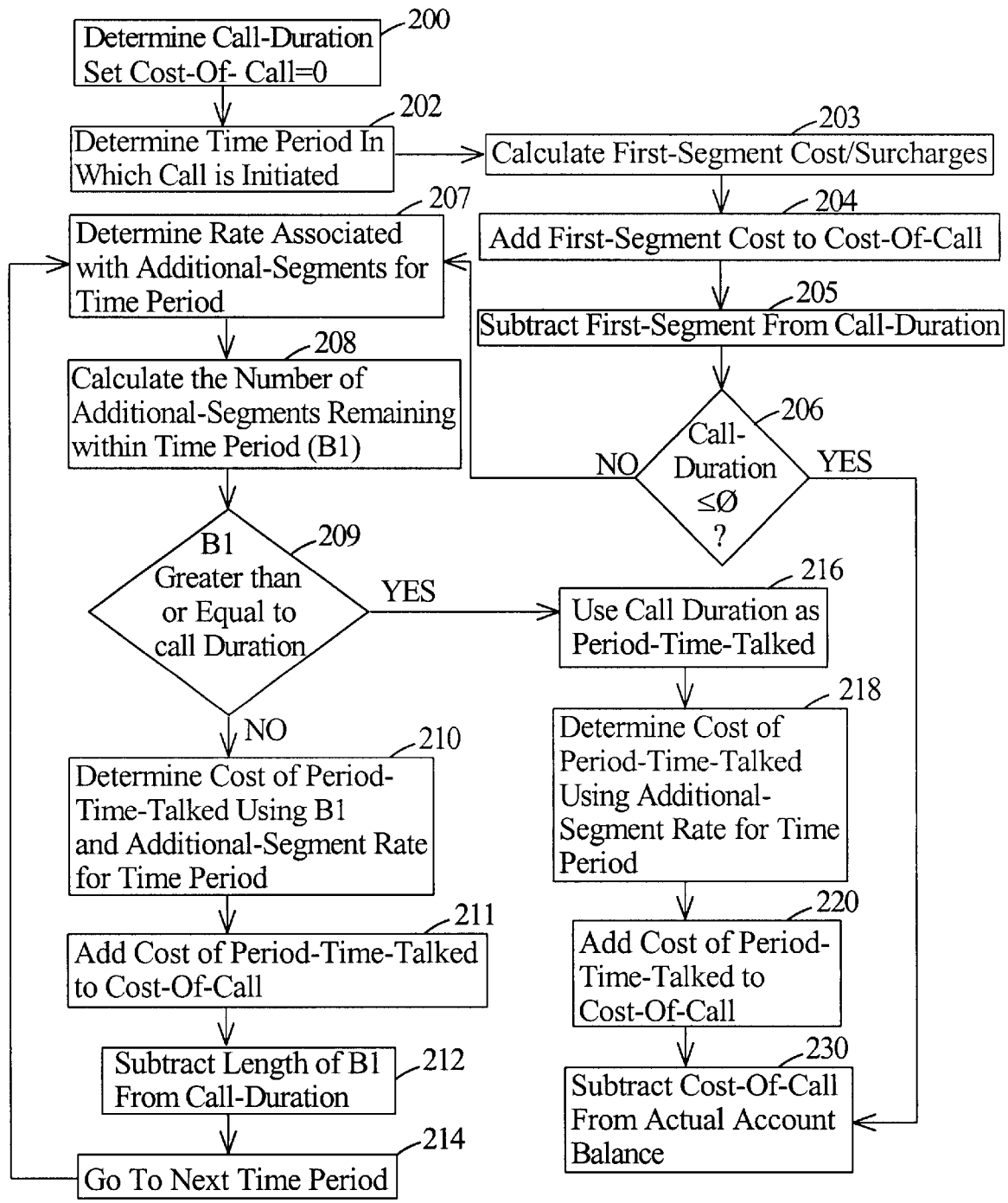
FIG. 6 is a flowchart illustrating the process used in determining the cost of a call for one embodiment of the present invention.

As shown in the embodiment of FIG. 6, the process illustrated in FIG. 4 may be altered slightly for billing purposes. In a billing application, only the B1 value is used while the ACCOUNT BALANCE is replaced with the CALL DURATION. As indicated, the system determines the CALL DURATION (200) and the time period in which the call is initiated (202). The system calculates the FIRST-SEGMENT cost including applicable surcharges (203) and adds this cost to the total cost for the call ("COST-OF-CALL") (204).

The length of the FIRST-SEGMENT is then subtracted from CALL-DURATION. If the remaining CALL-DURATION is less than or equal to zero, COST-OF-CALL reflects the total cost for the call and is subtracted from the actual account balance. Otherwise, the system determines the ADDITIONAL-SEGMENTS rate for the time period, calculates B1 (the number of ADDITIONAL-SEGMENTS remaining within the time period), and compare B1 with CALL-DURATION (206, 208). If B1 is greater than or equal to CALL DURATION (i.e., the call ended during this time period), the COST-OF-PERIOD-TIME-TALKED is calculated using CALL DURATION and the ADDITIONAL-SEGMENTS rate for the time period (216, 218). The COST-OF-PERIOD-TIME-TALKED is added to the total COST-OF-CALL which is then subtracted from the actual account balance (220, 230).

If B1 is less than CALL DURATION, B1 is used to calculate the COST-OF-PERIOD-TIME-TALKED which is added to the total COST-OF-CALL and CALL DURATION is reduced by B1 (yielding the amount of time left to apply to next time period) (210, 212). The system then repeats the ADDITIONAL-SEGMENTS calculations for the subsequent time periods until the time period in which the call terminated is reached (214).

An example of the above process for one embodiment of the invention is illustrated by FIG. 7. The call, initiated in the AFTERNOON time period at 4PM, had a CALL DURATION of 180 minutes. Calculating the cost of a FIRST-SEGMENT=5 minutes at a rate of 20¢/min yields a $1 FIRST-SEGMENT cost (assuming no applicable surcharges) which is added to COST-OF-CALL [COST-OF-CALL=$1]. Subtracting the length of FIRST-SEGMENT from CALL-DURATION yields a remaining CALL-DURATION=175 minutes. Next, the number of ADDITIONAL-SEGMENTS remaining in the AFTERNOON time period, B1=115 minutes, is determined. Since B1 is less than the CALL DURATION, B1 is used to reduce the CALL DURATION to 60 minutes and to calculate the COST-OF-AFTERNOON-TIME-TALKED=$17.25 (115 min×15¢/min) which is added to COST-OF-CALL [COST-OF-CALL=$18.25]. Next, the EVENING time period is considered. The ADDITIONAL-SEGMENTS billing rate (10¢/min) and B1=360 minutes are determined for the EVENING TIME PERIOD. Since B1 is greater than the CALL DURATION, the call was terminated during this time period. The CALL DURATION is used to calculate the COST-OF-EVENING-TIME-TALKED=$6 (60 minutes× 10¢/min) which is added to COST-OF-CALL to yield a total cost for the call of $24.25.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. In a prepaid telephone system, a method for providing account information to a subscriber comprising:

(a) receiving a call from the subscriber requesting the account information;

(b) obtaining a personal identification number (PIN) from the subscriber;

(c) retrieving a copy of the subscriber's account balance from a database using the PIN;

(d) establishing a maximum allowable talk time for the subscriber;

(e) dividing time into plural time periods;

(f) dividing the time periods in which the call exists into a series of time segments commencing with the initiation of the call, each of the time segments having a billing rate associated therewith;

(g) determining the time at which the call is initiated;

(h) determining the cost for the first time segment of the call;

(i) subtracting the cost of the first segment from the copy of the subscriber's account balance;

(j) determining the number of time segments remaining in the time period in which the call was initiated until the length of the call reaches the maximum allowable talk time;

(k) determining the number of additional time segments remaining in the time period in which the call was initiated;

(l) calculating the number of additional time segments in the time period in which the call was initiated that the subscriber can afford to use by considering the subscriber's account balance;

(m) using the lowest number of additional time segments determined in steps (j), (k) and (l) and the assigned billing rate for the additional time segments of the time period in which the call was initiated to determine a cost of the additional time segments during the time period in which the call was initiated;

(n) subtracting the cost of the additional time segments from the copy of the account balance;

(o) repeating steps (j–n) for additional time periods until either the account can no longer afford additional time segments or the remaining maximum allowable talk time is exhausted;

(p) adding the costs of the call for each time period; and, (q) providing the result to the subscriber.

2. A method of calculating the maximum talk time available to a subscriber comprising the steps of:

(a) establishing a maximum allowable talk time for the subscriber;

(b) dividing time into plural time periods;

(c) dividing each time period into a series of time units, each of the time units having a billing rate associated therewith;

(d) determining the time at which the call begins;

(e) determining a cost of the call for the time period in which the call is initiated by considering all of the following:
    a maximum number of time units remaining in the time period,
    a predetermined system maximum number of time units, and
    a maximum number of time units available in the time period based on subscriber funds and selecting the period of time corresponding to the smallest number of time units for use in determining the cost of the call;

(f) subtracting the cost of the call from a copy of the subscriber's account balance;

(g) repeating steps (e–f) for subsequent time periods until the subscriber's account balance is exhausted; and (h) totaling the costs of the call for each time period.

3. The method of claim 1, further comprising the step of assigning at least time unit to each time segment.

4. The method of claim 3, wherein the start time of the call is aligned with next available time unit.

5. The method of claim 2, wherein the start time of the call is aligned with the next available time unit.

6. The method of claim 2, wherein the subscriber's account balance is retrieved using a personal identification number.

7. The method of claim 2, wherein the number of time units associated with the calculated total cost is reported to the subscriber.

8. In a method for calculating the amount of talk time available for a subscriber in a prepaid telephone system, the improvement comprising the steps of dividing time into a plurality of time periods each time period having a billing rate associated therewith and determining the amount of time remaining in the time period in which the call was initiated thereby allowing the cost of talk time for each time period in which the call exists to be calculated separately.

\* \* \* \* \*